(12) United States Patent
Jung et al.

(10) Patent No.: US 9,184,859 B2
(45) Date of Patent: Nov. 10, 2015

(54) APPARATUS AND METHOD FOR DETERMINING RECEIVED SIGNAL LEVEL IN RAY-TRACING WAVE PROPAGATION ENVIRONMENT

(71) Applicant: Electronics and Telecommunications Research Institute, Daejeon (KR)

(72) Inventors: Myoung-Won Jung, Daejeon (KR); Young Jun Chong, Daejeon (KR); Jong Ho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 351 days.

(21) Appl. No.: 13/899,244

(22) Filed: May 21, 2013

(65) Prior Publication Data

US 2014/0287706 A1    Sep. 25, 2014

(30) Foreign Application Priority Data

Mar. 20, 2013  (KR) .......................... 10-2013-0029660

(51) Int. Cl.
*H04B 17/00*    (2015.01)
*H04B 17/318*   (2015.01)

(52) U.S. Cl.
CPC .................................... *H04B 17/318* (2015.01)

(58) Field of Classification Search
None
See application file for complete search history.

(56) References Cited

U.S. PATENT DOCUMENTS

| | | | | |
|---|---|---|---|---|
| 3,242,488 A | * | 3/1966 | Leyde et al. | 342/92 |
| 4,334,780 A | * | 6/1982 | Pernick | 356/512 |
| 5,608,527 A | * | 3/1997 | Valliant et al. | 356/600 |
| 6,137,433 A | * | 10/2000 | Zavorotny et al. | 342/26 B |
| 8,208,916 B2 | | 6/2012 | Jung et al. | |
| 8,237,711 B2 | | 8/2012 | McCombe et al. | |
| 2003/0030582 A1 | * | 2/2003 | Vickers | 342/54 |
| 2008/0123106 A1 | * | 5/2008 | Zeng et al. | 356/600 |

(Continued)

FOREIGN PATENT DOCUMENTS

| | | | |
|---|---|---|---|
| GB | 2428476 A | * | 1/2007 |
| KR | 1020110068737 A | | 6/2011 |
| KR | 1020120041393 A | | 5/2012 |
| KR | 1020120072209 A | | 7/2012 |
| WO | WO 2007090378 A2 | * | 8/2007 |

OTHER PUBLICATIONS

Vittorio Degli-Esposti et al., Measurement and Modeling of Scattering From Buildings, IEEE Transactions on Antennas and Propagation, Jan. 2007, pp. 143-153, vol. 55, No. 1, Bologna, Italy.

(Continued)

*Primary Examiner* — Lana N Lee
(74) *Attorney, Agent, or Firm* — William Park & Associates Ltd.

(57) ABSTRACT

An apparatus for determining a received signal level of a radio wave in a ray-tracing wave propagation environment includes a reception unit configured to receive the radio wave; and an analyzing unit configured to determine the received signal level of the radio wave in the ray-tracing wave propagation environment. Further, the analyzing unit is configured to analyze a correlation of the height and altitude of a surface roughness that recognizes the surface of a surrounding obstacle depending on the length of wavelength in the course of delivery of a received signal of the radio wave and analyze precisely the scattering of the received signal depending on the surface roughness to determine the received signal level of the radio wave when determining the received signal level.

9 Claims, 9 Drawing Sheets

(56) References Cited

U.S. PATENT DOCUMENTS

| | | | |
|---|---|---|---|
| 2010/0035569 A1* | 2/2010 | Aoyama | 455/226.4 |
| 2011/0134001 A1* | 6/2011 | Sakata et al. | 343/703 |
| 2012/0162005 A1 | 6/2012 | Jung | |
| 2014/0266856 A1* | 9/2014 | LaPoint et al. | 342/59 |

OTHER PUBLICATIONS

B. Langen et al., Reflection and transmission behaviour of building materials at 60 GHz, 5th IEEE International Symposium, Sep. 18-23, 1994, pp. 505-509, vol. 2, Ulm, Germany.

* cited by examiner

APPARATUS AND METHOD FOR DETERMINING RECEIVED SIGNAL LEVEL IN RAY-TRACING WAVE PROPAGATION ENVIRONMENT

CROSS-REFERENCE TO RELATED APPLICATION(S)

The present invention claims priority of Korean Patent Application No. 10-2013-0029660, filed on Mar. 20, 2013, which is incorporated herein by reference.

FIELD OF THE INVENTION

The present invention relates to a method for predicting a ray-tracing wave propagation environment, and more particularly, the present invention relates to a method and apparatus for determining a received signal level of a radio wave in a ray-tracing wave propagation environment, which analyzes a correlation of the height and altitude of the surface roughness that recognizes the surface of a surrounding obstacle depending on the length of wavelength in the course of delivery of a received signal to derive the distribution of signal strength, traveling direction and reflection and transmissive characteristic of the radio wave, analyze precisely the scattering of the received signal depending on surface roughness and approximate the factors which may reduce an overload by analysis time to determine the magnitude of the received signal delivered to a receiver, thereby reducing an error in a ray-tracing technique and improving the accuracy and efficiency of predicting the wave propagation characteristic, when a wave propagation is predicted in a high frequency band over a millimeter wave.

BACKGROUND OF THE INVENTION

A conventional ray-tracing method has been optimized to predict the wave propagation characteristic in a frequency band of the mobile communication of 10 GHz or less. Mobile communication systems to be introduced in the future use remarkably shorter wavelength of mm wave or sub-mm wave band more than 6 GHz and thus has a limit of employing the radio wave tracking method. Accordingly, it is necessary to more accurately approximate the progress of the radio wave and the magnitude of the received signal to a receiver.

FIG. 1 is a conceptual diagram illustrating the determination of a reception radius in a ray launching method of a related art.

Referring to FIG. 1, a three-dimensional ray-tracing method starts a ray-tracing by applying the ray launching method. In the ray launching method, the maximum number of rays emitted from a virtual spherical body is set to be N, the rays (where n={1, 2, 3, ..., N}) is individually emitted in a space in order.

The rays 'n' emitted from a transmission point 100 are individual incident on a surrounding material and terrain and then are changed in their directions through diffraction and reflection. Finally, the rays pass through the reception radius 104 defined about the reception point 102 to determine the presence or absence of reception of the rays. Such series of procedures refers to as a ray-tracing. The rays that enter the reception radius are treated that the track thereof has been completed, and a following track is progressed on a subsequent ray to be emitted. In this case, the track completion may be determined by whether the rays have passed through the reception radius.

FIG. 2 illustrates the problems occurred due to a method of determining a reception radius in accordance with a related art. When using the method of determining the reception radius, the difference in a distance between the transmission point 100 and the receiving point 102 causes problems that a double counting and a dead zone occur. These problems originate from the reason that the magnitude of all rays entering the reception radius is treated to be '1'. Owing to that, reducing the magnitude of the reception radius entails the increase of a shadow area and increasing the magnitude of the reception radius entails the increase of an overlap calculation more and more, which acts as a factor that increases the error in the wave propagation characteristic.

SUMMARY OF THE INVENTION

In view of the above, the present invention provides a method and apparatus for determining a received signal level of a radio wave in a ray-tracing wave propagation environment, which analyzes a correlation of the height and altitude of the surface roughness that recognizes the surface of a surrounding obstacle depending on the length of wavelength in the course of delivery of a received signal to derive the distribution of signal strength, traveling direction and reflection and transmissive characteristic of the radio wave, analyze precisely the scattering of the received signal depending on a surface roughness and approximate a factor which may reduce an overload by an analysis time to determine the magnitude of the received signal delivered to a receiver, thereby reducing an error in a ray-tracing technique and improving the accuracy and efficiency of predicting the wave propagation characteristic, when a wave propagation is predicted in a high frequency band over a millimeter wave.

In accordance with a first aspect of the present invention, there is provided an apparatus for determining a received signal level of a radio wave in a ray-tracing wave propagation environment. The apparatus includes a reception unit configured to receive the radio wave; and an analyzing unit configured to determine the received signal level of the radio wave in the ray-tracing wave propagation environment. Here, the analyzing unit is configured to analyze a correlation of the height and altitude of a surface roughness that recognizes the surface of a surrounding obstacle depending on the length of wavelength in the course of delivery of a received signal of the radio wave and analyze precisely the scattering of the received signal depending on the surface roughness to determine the received signal level of the radio wave when determining the received signal level.

Further, the analyzing unit may be configured to render the received signal level the radio wave to be '1' within a one-half region of the reception radius and the received signal level of the radio wave to be 1/(n−1) (where n={1, 2, 3, ..., N}) within a region over a one-half of the reception radius with respect to a reception radius within which the radio wave is received and a magnitude of the radio wave.

Further, the analyzing unit may be configured to derive the distribution of signal strength, traveling direction and reflection and transmissive characteristic of the radio wave by analyzing the correlation of the height and altitude of the surface roughness.

Further, the analyzing unit may be configured to analyze the scattering of the received signal of the radio wave to approximate a factor which reduces an overload by an analysis time to determine the received signal level of the radio wave.

Further, the radio wave may comprise a radio wave in a high frequency band over a millimeter wave.

In accordance with a second aspect of the present invention, there is provided a method for determining a received signal level in a ray-tracing wave propagation environment. The method includes receiving a radio wave transmitted from a transmitter; analyzing a correlation of the height and altitude of the surface roughness that recognizes the surface of a surrounding obstacle depending on a length of wavelength of the radio wave in the course of receiving the radio wave; and determining the received signal level of the radio wave by analyzing the scattering of the received signal of the radio wave depending on the surface roughness.

Further, said determining the received signal level of the radio wave may comprise rendering the received signal level the radio wave signal to be '1' within a one-half region of the reception radius and rendering the received signal level of the radio wave signal to be $1/(n-1)$ (where n={1, 2, 3, ..., N}) within a region over a one-half of the reception radius with respect to a reception radius within which the radio wave is received and a magnitude of the radio wave.

Further, said analyzing a correlation of the height and altitude of the surface roughness may comprise deriving the distribution of signal strength, traveling direction and reflection and transmissive characteristic of the radio wave by analyzing the correlation of the height and altitude of the surface roughness.

Further, said determining the received signal level of the radio wave may comprise analyzing the scattering of the received signal of the radio wave to approximate a factor which reduces an overload by an analysis time to determine the received signal level of the radio wave.

In accordance with the exemplary embodiment, in the method for determining a received signal level of a radio wave in a ray-tracing wave propagation environment, the method includes analyzing a correlation of the height and altitude of the surface roughness that recognizes the surface of a surrounding obstacle depending on the length of wavelength in the course of delivery of a received signal to derive the distribution of signal strength, traveling direction and reflection and transmissive characteristic, thereby determining the magnitude of the received signals delivered to a receiver to reduce an error in a ray-tracing technique.

Further, the method includes analyzing precisely the scattering of the received signals depending on surface roughness and approximating a factor which may reduce an overload by an analysis time, improving the accuracy and efficiency of predicting the wave propagation characteristic, without increasing the load for the analyzing time.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Hereinafter, the principle of operation of the present invention will be described with reference to the accompanying drawings. In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

Figure 1:
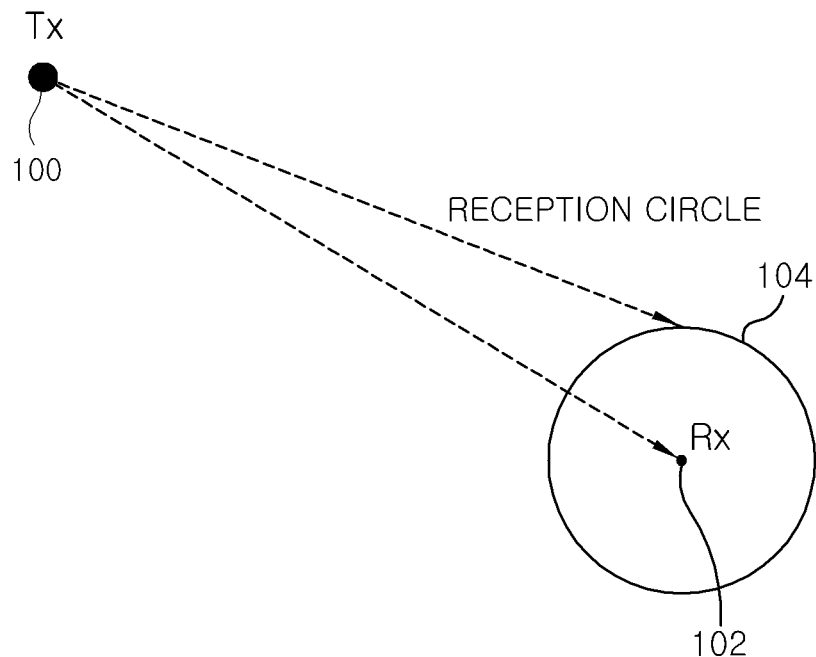
FIG. 1 is a conceptual diagram illustrating the determination of a reception radius in a ray launching method of a related art.
Figure 2:
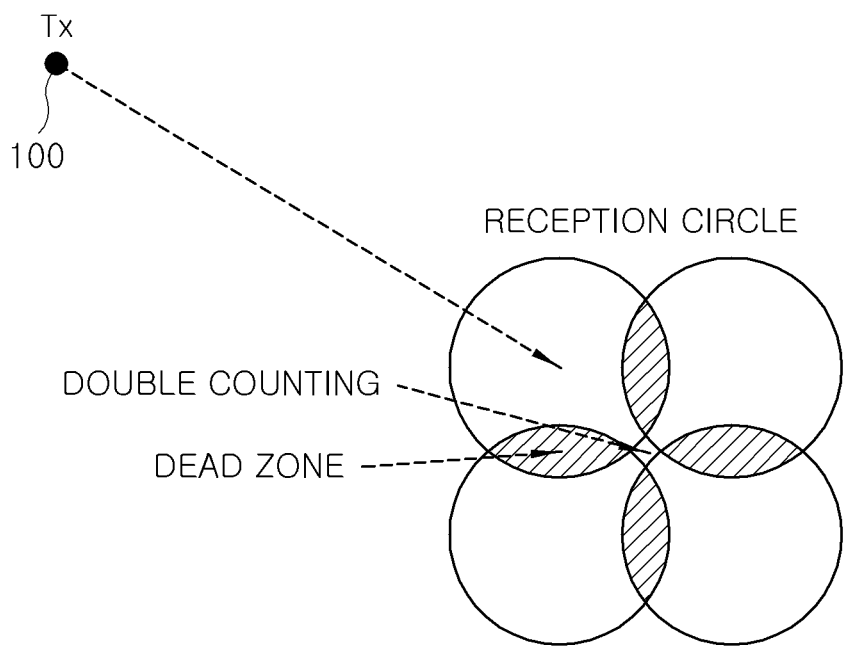
FIG. 2 illustrates the problems occurred due to a method of determining a reception radius of a related art.
Figure 3:
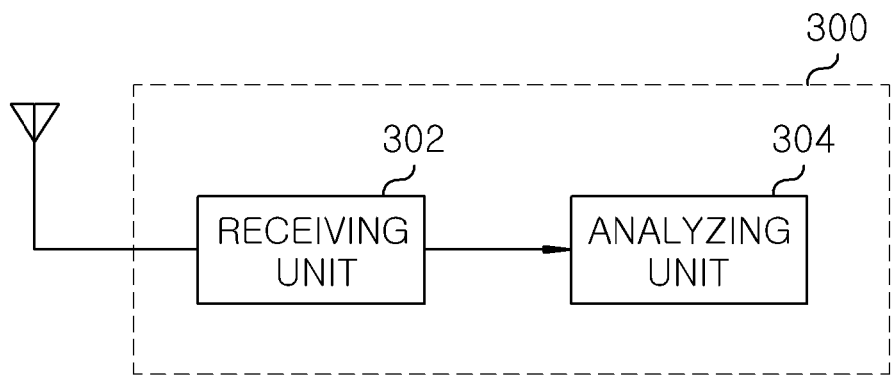
FIG. 3 is a detailed block diagram of an apparatus for determining a reception radius in a ray-tracing wave propagation environment in accordance with an exemplary embodiment of the present invention.

FIG. 3 is a detailed block diagram of an apparatus for determining a reception radius in a ray-tracing wave propagation environment in accordance with an exemplary embodiment of the present invention, which includes a receiving unit 302 and an analyzing unit 304.

Referring to FIG. 3, the receiving unit 302 receives radio waves in a high frequency band over a millimeter wave transmitted from a transmission point.

The analyzing unit 304 determines a received signal level of the radio waves from the receiving unit 302 in the ray-tracing wave propagation environment. More specifically, when a wave propagation is predicted in a high frequency band over a millimeter wave in order for the determination of the received signal level of the radio waves, the analyzing unit 304 analyzes a correlation of the height and altitude of the surface roughness that recognizes the surface of a surrounding obstacle depending on the length of wavelength in the course of delivery of received signals to derive the distribution of signal strength, traveling direction and reflection and transmissive characteristic of the radio waves. Further, the analyzing unit 304 precisely analyzes the scattering of the received signals depending on a surface roughness and approximate a factor which may reduce an overload by an analysis time to determine the magnitude of the received signals delivered to a receiver, thereby reducing an error in a ray-tracing technique and improving the accuracy and efficiency of predicting the wave propagation characteristic.

In addition, the analyzing unit 304 determines the received signal level of the radio waves in such a way that the received signal level of the radio wave renders to be '1' within a one-half region of the reception radius and the received signal level of the radio wave renders to be $1/(n-1)$ (within a region over a one-half of the reception radius. Such a way as set forth above will be described with reference to FIG. 4.

Figure 4:
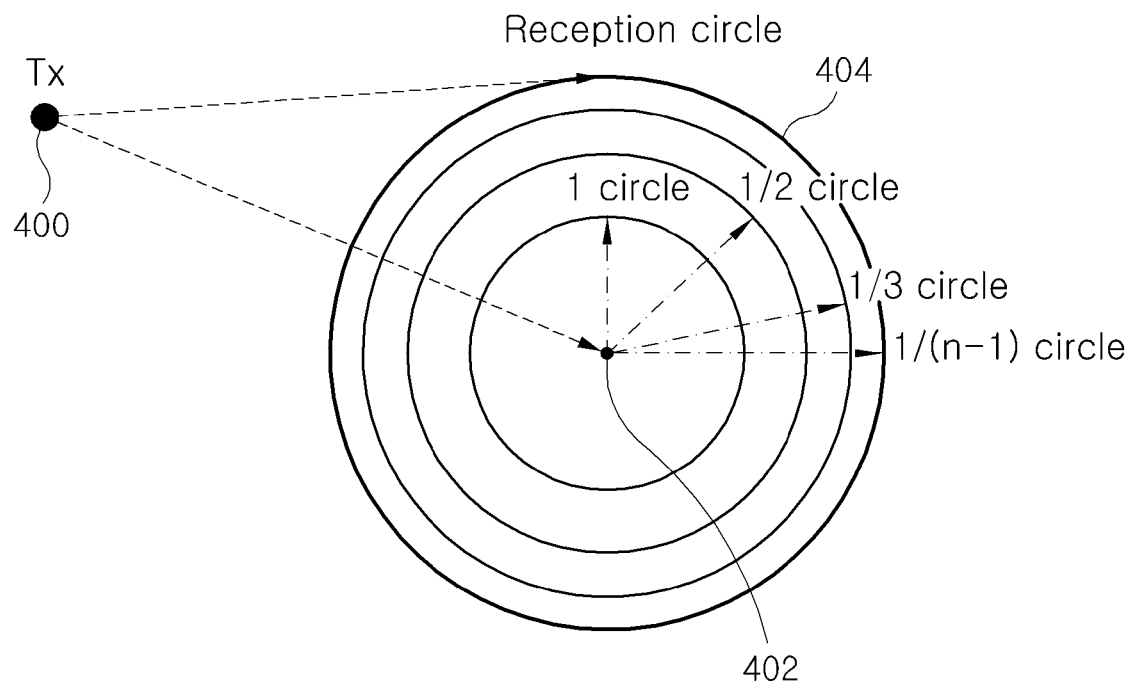
FIG. 4 is a conceptual diagram illustrating a method for determining a reception radius in accordance with an exemplary embodiment of the present invention.
Figure 5A:
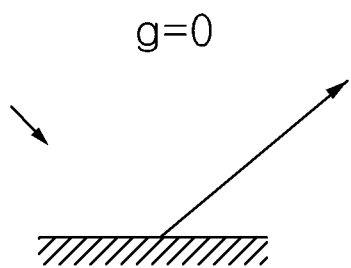
FIGS. 5A to 5D are diagrams illustrating a roughness of a surface depending on a parameter 'g' in accordance with an exemplary embodiment of the present invention.
Figure 5B:
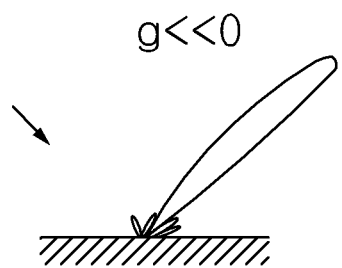
Figure 5C:
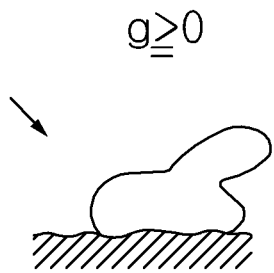
Figure 5D:
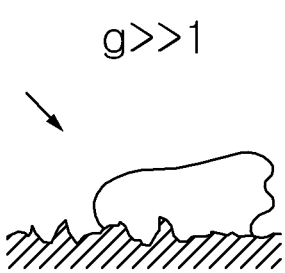

FIG. 4 is a conceptual diagram illustrating a method for determining a reception radius in accordance with an exemplary embodiment of the present invention.

Referring to FIG. 4, in accordance with a proposed method of the embodiment, the shadow region can be eliminated by controlling the magnitude of the rays received in line with the ranges of the reception radius 404 and the error caused by the double calculation can be reduced by increasing the magnitude of the reception radius. This proposed method renders the magnitude of the rays to be '1' within a one-half region of the reception radius and the magnitude of the ray renders to be reduced within a region over the one-half of the reception radius as a percentage to a total full radius. As an ½ is a criterion point, the percentage of the radius renders to be 1/(n−1). Coverage of received signal strength of the rays depending on the reception radius uses the method to apply in proportion to the distance between the transmission point 400 and the reception point 402.

Following Equation 1 is an improved equation for calculating an average scattering power on any surface, which has been obtained by Kirchhoff's solution.

$$\langle \rho \rho^* \rangle = e^{-g}\left(\rho_0^2 + \frac{\pi T^2 F_3^2}{A}\sum_{m=1}^{\infty} \frac{g^m}{m!m} e^{-v_{xy}^2 T^2/4m}\right) \quad \text{[Equation 1]}$$

$$\sqrt{g} = v_z \sigma = 2\pi\frac{\sigma}{\lambda}(\cos\theta_1 + \cos\theta_2)$$

This method, which is a two-dimensional Kirchhoff's solution to an arbitrary rough surface having a regular distribution function, is a method for applying a scattering pattern of a scattering algorithm to a three-dimensional ray-tracing in consideration of a two-dimensional surface.

Further, this method introduces a parameter 'g' in the Equation 1 in order to analyze the average scattering power in consideration of the standard deviation and the correlation distance of a height of the surface roughness. However, Equation 1 needs to be solved in a numerical analysis, which leads to a computational overload on the ray-tracing.

Therefore, in order to apply Equation 1 to the ray-tracing, the Equation 1 needs to be approximated and the approximation may be accomplished by the introduced parameter 'g' because the parameter becomes the measure to represent the roughness level of the surface as shown in FIGS. 5A to 5D. Accordingly, the Kirchhoff's solution approximation in an arbitrary rough surface having a regular distribution function may be approximated in three different cases depending on the parameter 'g' except that the parameter 'g' is zero (0), which represents the specula reflection. When the parameter 'g' is zero, it becomes the same as the Snell's law and thus not considered in analyzing the scattering characteristic.

That the parameter 'g' is significantly smaller than '1' means that the surface roughness is also considerably smaller and thus the surface approximates to a smooth surface. In this case, the series formula in Equation 1 is converged remarkably quickly. Therefore, it is possible to approximate the series formula only in consideration of a case of m=1. The result is represented as the following Equation 2.

$$\langle \rho \rho^* \rangle = e^{-g}\left(\rho_0^2 + \frac{\pi T^2 F_3^2}{A} e^{-v_{xy}^2 T^2/4}\right) \quad \text{[Equation 2]}$$

Meanwhile, in a case where the parameter 'g' approximates to '1', it is impossible to approximate the series formula correctly. Accordingly, the range of the series formula may be confined using a non-equivariance, but this may make an error large and thus is not considered any more. However, in an exceptional case where the parameter 'g' is '1', the approximation is possible with respect to a specula reflection as in a following Equation 3.

$$D\{p\} = \frac{\pi T^2}{A}\sum_{m=1}^{\infty} \frac{1}{m!m} = 0.95\frac{T^2}{A} \quad \text{[Equation 3]}$$

By using this method, in a case where the parameter 'g' in the above Equation 3 approximates to '1', the approximation can be achieved assuming that the parameter 'g' is '1'.

Meanwhile, that the parameter 'g' is highly large represents that the surface roughness is extremely large. In this case, the average scattering coefficient $\langle \rho \rangle$ in a first formula of the Equation 1 becomes '0' and thus it comes in a relation formula such as Equation, $D\{p\}=\langle pp^* \rangle$. Therefore, the approximation is possible using this relation formula and the result is expressed in the following Equation 4.

$$D\{p\} = \frac{\pi F^2 T^2}{Ag}\exp\left(-\frac{v_{xy}^2 T^2}{4g}\right) \quad \text{[Equation 4]}$$

$$= \frac{\pi F^2 T^2}{A v_z^2 \sigma^2}\exp\left(-\frac{v_{xy}^2 T^2}{4 v_z^2 \sigma^2}\right)$$

The Equation 4 is a formula only considering the roughness of the surface and is a result corresponding to only a full conductor. Accordingly, when the radio wave prediction is done in consideration of the scattering characteristic depending on the surface roughness in an actual environment, the following Equation 5 can be derived.

$$\langle \rho \rho^* \rangle_f = \langle RR^* \rangle \langle \rho \rho^* \rangle_\infty$$

$$\langle R \rangle \approx R(\theta_1)$$

$$\langle \rho \rho^* \rangle_f = (R^\pm(\theta_1))\langle \rho \rho^* \rangle_\infty \quad \text{[Equation 5]}$$

where $R^\pm$ denotes a reflection coefficient wherein '+' represents a vertical polarization and '−' represents a horizontal polarization.

In this case, to obtain an average reception power in consideration of a polarization characteristic in an incident wave is possible to predict a correct wave propagation. The result can be expressed the following Equation 6.

$$\langle P_r \rangle = (R^\pm(\theta_1))^2 \frac{1}{2} Y_0 \langle \rho \rho^* \rangle |E_{20}|^2 \quad \text{[Equation 6]}$$

$$1 = A(P_i^+) + (1-A)(P_i^-)$$

$$\begin{bmatrix} \langle P_r^+ \rangle \\ \langle P_r^- \rangle \end{bmatrix} =$$

$$\begin{bmatrix} (R^+(\theta_1))^2 \frac{1}{2} Y_0 \langle \rho \rho^* \rangle |E_{20}|^2 & 0 \\ 0 & (R^-(\theta_1))^2 \frac{1}{2} Y_0 \langle \rho \rho^* \rangle |E_{20}|^2 \end{bmatrix}$$

$$\begin{bmatrix} A \\ (1-A) \end{bmatrix}$$

Figure 6A:
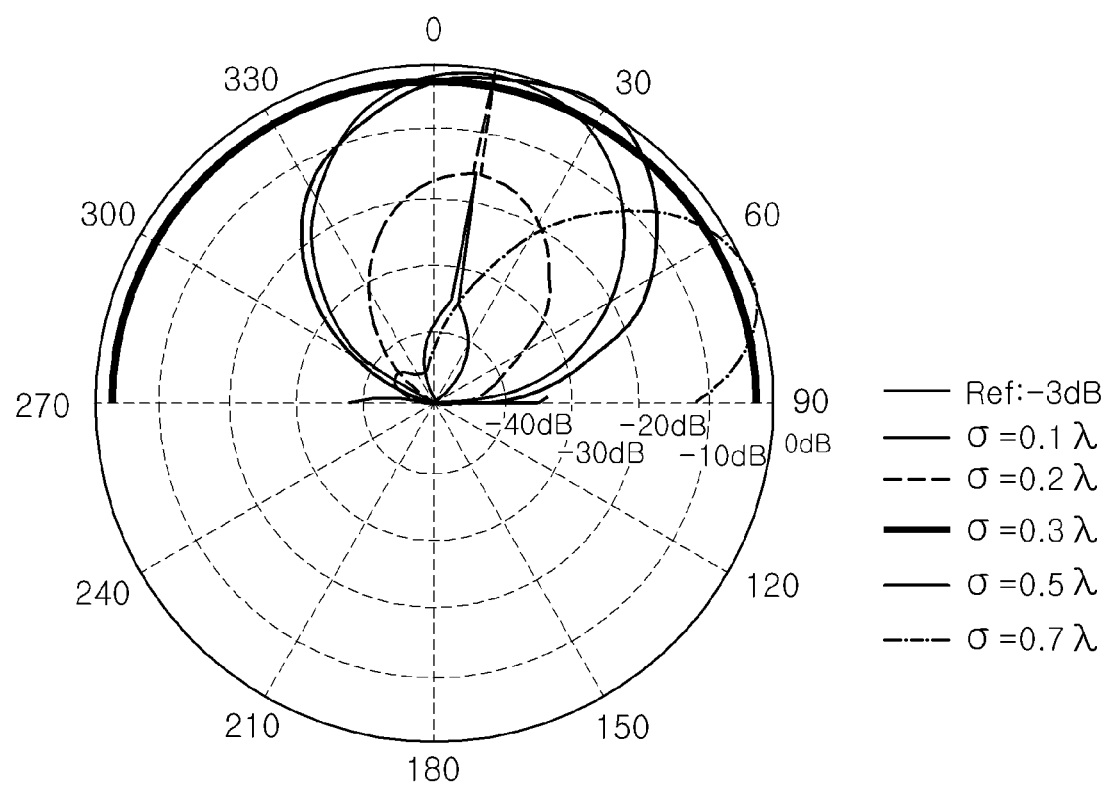
FIGS. 6A to 6C are exemplary diagrams illustrating a result of scattering characteristic analyzed on a basis of a standard deviation in accordance with an exemplary embodiment of the present invention.
Figure 6B:
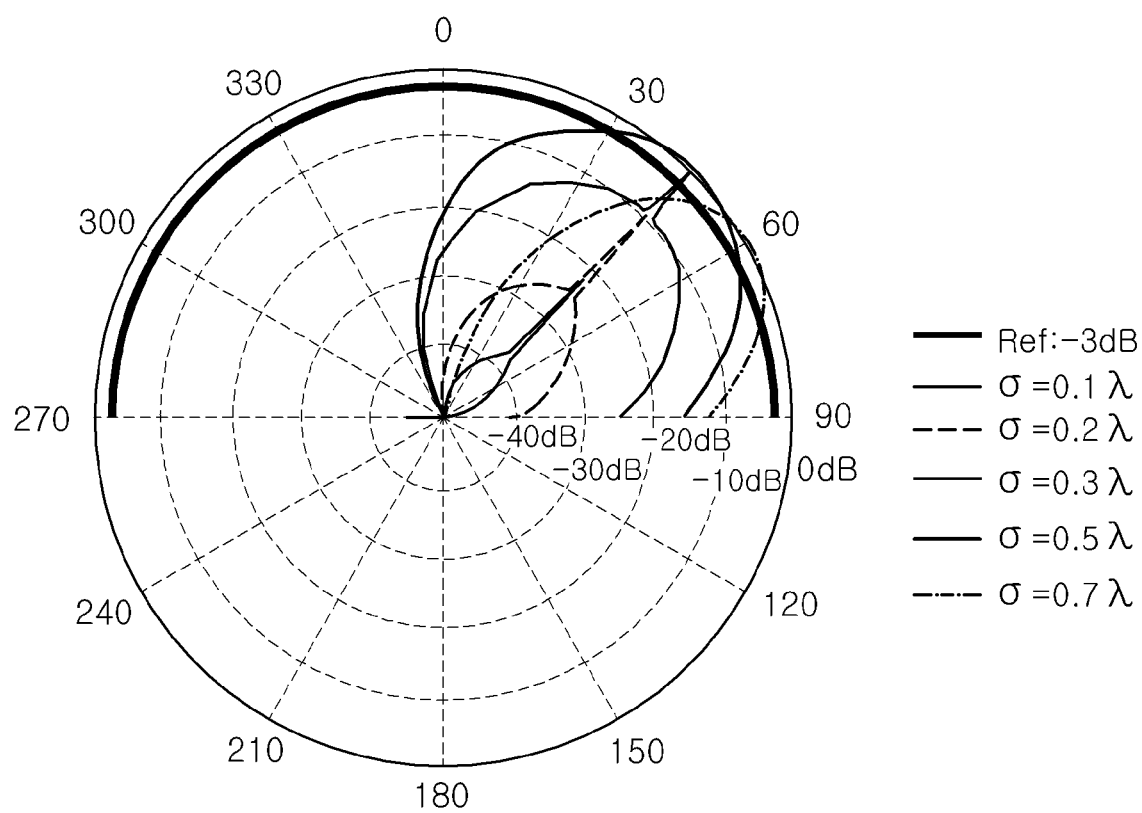
Figure 6C:
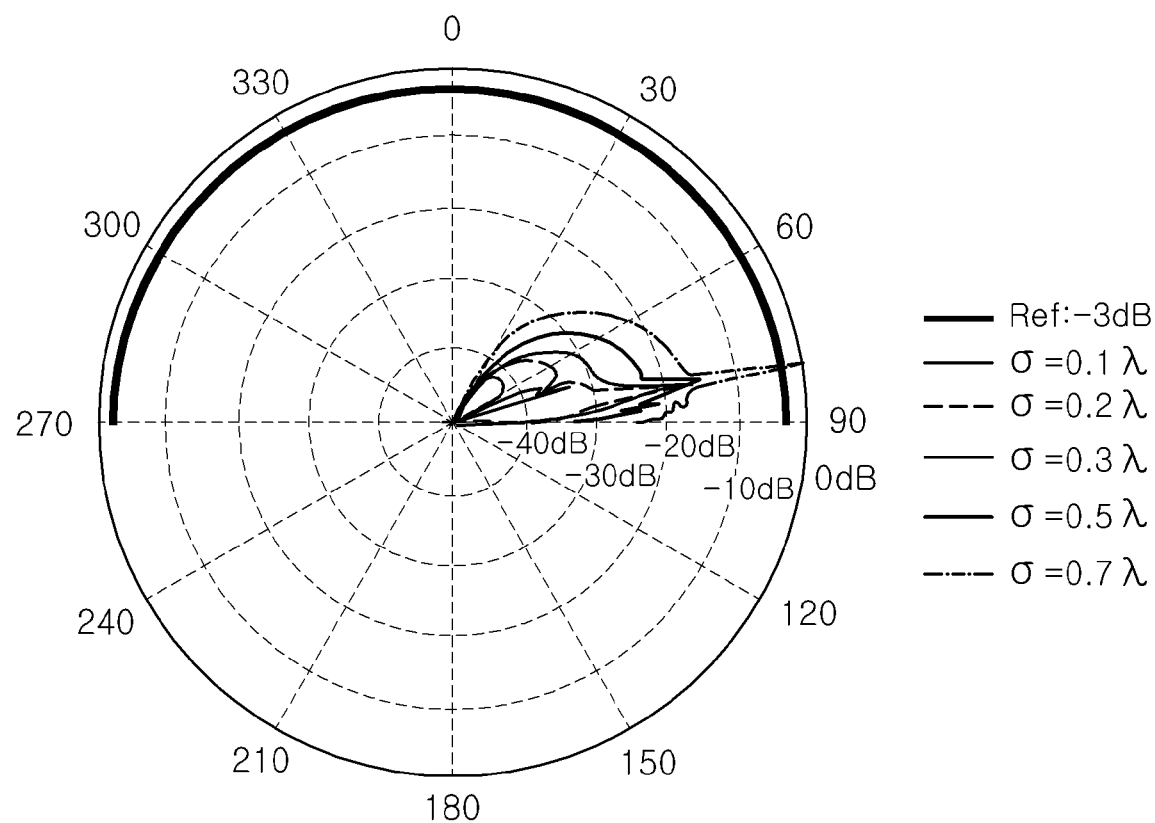

By using the above approximated Equation, the scattering characteristic is analyzed on a basis of a standard deviation depending on the height of the rough surface, the result of which is illustrated in FIGS. 6A to 6C. FIGS. 6A to 6C represent the analysis results of the distribution characteristics of the scattering signal depending on the incident signal on angles of 10°, 45°, and 80°, respectively.

As known from the above results, it can be observed that as the signal is incident on a small incident angle as close as possible to perpendicular to the surface, the specula reflection component disappears at the lower surface roughness. In other words, it can be observed that the incident signal does not come to the specula reflection at σ=0.32λ when θ₁=10° and the direction of a main beam deviates while the incident signal comes to the specula reflection even at σ=1λ when θ₁=80°. However, in all cases, it shows commonly that the higher the surface roughness σ, the specula reflection component decreases and the scattering component increases.

Figure 7A:
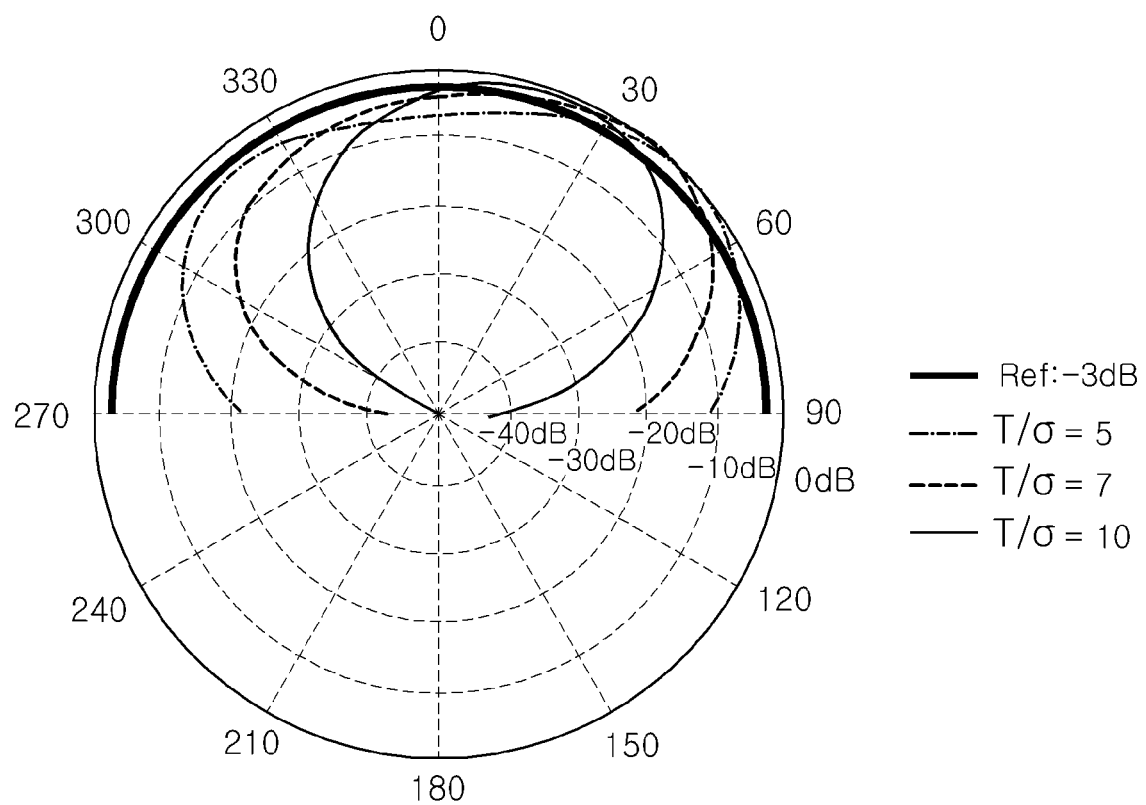
FIGS. 7A to 7C are exemplary diagrams illustrating a result of scattering characteristic analyzed depending on a correlation distance in accordance with an exemplary embodiment of the present invention.
Figure 7B:
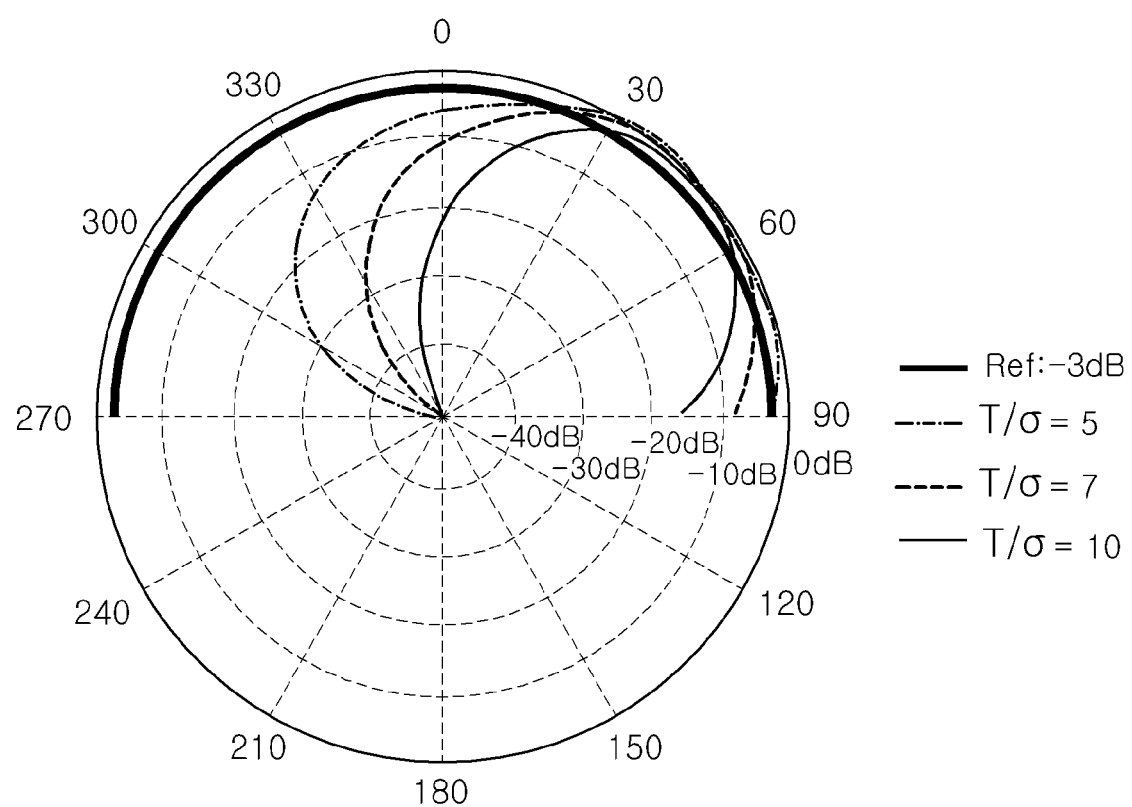
Figure 7C:
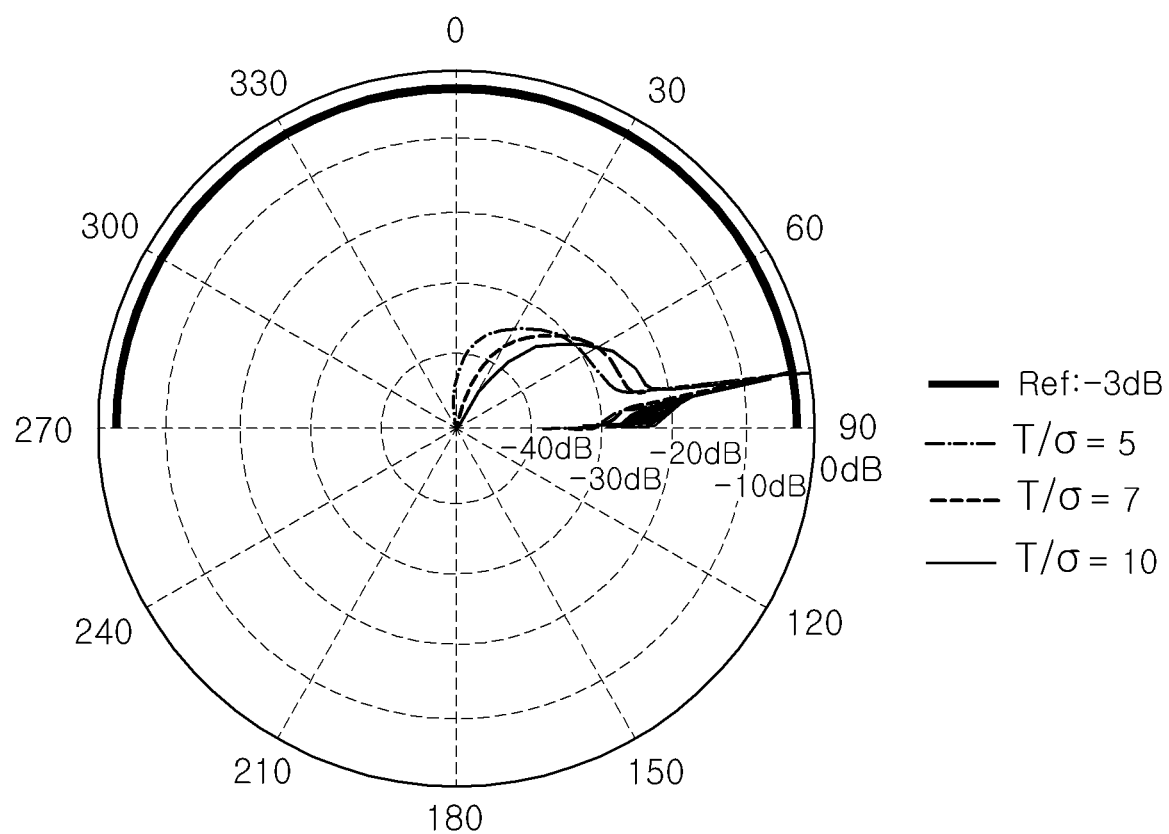

The roughness of the rough surface determines the scattering characteristic by the height distribution of the rough surface and the correlation distance of the rough surface. The scattering characteristic is shown in FIGS. 7A to 7C when considering both the two mechanisms. FIGS. 7A to 7C represent the analysis results of the distribution characteristics of the scattering signal depending on the incident signal on incident angles of 10°, 45° and 80°, respectively. As known from these results, it shows a characteristic that as the smaller T/σ, a scattering effect becomes larger to increase the scattered component, which results in increasing the beam width. In particular, it can also be observed that, in a case where the incident angle is θ₁=10°, as smaller T/σ, the specula reflection is eliminated and scattered in either direction. Further, for the compensation value, it is observed that the change depending on T/σ is not so large relative, and this feature is even higher as the incident angle is large.

Through the analysis, if we can predict the reflection and scattering characteristics depending on the surface in the millimeter wave band, it is also possible to actually predict the energy transmitted back to the reflector. Assuming that the magnitude of the energy to be transferred is '1', the energy except for the reflection and scattering from the magnitude of '1' is transferred to the rear of the reflector, as shown in Equation 7.

$$\langle TT^* \rangle = 1 - \langle \rho\rho^* \rangle$$

$$\langle T \rangle \approx T(\theta_1) \qquad \text{[Equation 7]}$$

However, if a predefined transmissive characteristic is determined by the relationship between the incident and the reflection in accordance with the fundamental Snell's law, it is impossible for the embodiment of the present invention to approximate the transmitted energy, in a case where the approximation of the reflection characteristic depending on the surface roughness is not carried out because the reflection and scattering characteristic is applied differently in line with the condition of the surface roughness depending on the incident angle.

Therefore, on the basis of the conventional techniques that perform the analysis of the reflection and scattering characteristic depending on the surface roughness in the millimeter wave band, the transmissive characteristic can be analyzed.

As described above, in accordance with the exemplary embodiment, in the method for determining a received signal level of a radio wave in a ray-tracing wave propagation environment, when a wave propagation is predicted in a high frequency band over a millimeter wave, the method includes analyzing a correlation of the height and altitude of the surface roughness that recognizes the surface of a surrounding obstacle depending on the length of wavelength in the course of delivery of a received signal to derive the distribution of signal strength, traveling direction and reflection and transmissive characteristic of the radio wave, analyzing precisely the scattering of the received signals depending on surface roughness and approximating a factor which may reduce an overload by an analysis time to determine the magnitude of the received signal delivered to a receiver, thereby reducing an error in a ray-tracing technique and improving the accuracy and efficiency of predicting the wave propagation characteristic.

While the invention has been shown and described with respect to the exemplary embodiments, the present invention is not limited thereto. It will be understood by those skilled in the art that various changes and modifications may be made without departing from the scope of the invention as defined in the following claims.

What is claimed is:

1. An apparatus for determining a received signal level of a radio wave in a ray-tracing wave propagation environment, the apparatus comprising:
   a reception unit configured to receive the radio wave; and
   an analyzing unit configured to determine the received signal level of the radio wave in the ray-tracing wave propagation environment,
   wherein the analyzing unit is configured to analyze a correlation of the height and altitude of a surface roughness that recognizes the surface of a surrounding obstacle depending on the length of wavelength in the course of delivery of a received signal of the radio wave and analyze precisely the scattering of the received signal depending on the surface roughness to determine the received signal level of the radio wave when determining the received signal level.

2. The apparatus of claim 1, wherein the analyzing unit is configured to render the received signal level the radio wave to be '1' within a one-half region of the reception radius and the received signal level of the radio wave to be 1/(n−1) (where n={1, 2, 3, . . . , N}) within a region over a one-half of the reception radius with respect to a reception radius within which the radio wave is received and a magnitude of the radio wave.

3. The apparatus of claim 1, wherein the analyzing unit is configured to derive the distribution of signal strength, traveling direction and reflection and transmissive characteristic of the radio wave by analyzing the correlation of the height and altitude of the surface roughness.

4. The apparatus of claim 1, wherein the analyzing unit is configured to analyze the scattering of the received signal of the radio wave to approximate a factor which reduces an overload by an analysis time to determine the received signal level of the radio wave.

5. The apparatus of claim 1, wherein the radio wave comprises a radio wave in a high frequency band over a millimeter wave.

6. A method for determining a received signal level in a ray-tracing wave propagation environment, the method comprising:
   receiving a radio wave transmitted from a transmitter; and
   analyzing a correlation of the height and altitude of the surface roughness that recognizes the surface of a surrounding obstacle depending on a length of wavelength of the radio wave in the course of receiving the radio wave; and
   determining the received signal level of the radio wave by analyzing the scattering of the received signal of the radio wave depending on the surface roughness.

7. The method of claim 6, wherein said determining the received signal level of the radio wave comprises:
   rendering the received signal level the radio wave signal to be '1' within a one-half region of the reception radius and rendering the received signal level of the radio wave signal to be 1/(n−1) (where n={1, 2, 3, . . . , N}) within a region over a one-half of the reception radius with respect to a reception radius within which the radio wave is received and a magnitude of the radio wave.

8. The method of claim 6, wherein said analyzing a correlation of the height and altitude of the surface roughness comprises:

deriving the distribution of signal strength, traveling direction and reflection and transmissive characteristic of the radio wave by analyzing the correlation of the height and altitude of the surface roughness.

9. The method of claim 8, wherein said determining the received signal level of the radio wave comprises:

analyzing the scattering of the received signal of the radio wave to approximate a factor which reduces an overload by an analysis time to determine the received signal level of the radio wave.

\* \* \* \* \*